(12) United States Patent  (10) Patent No.: US 8,584,867 B2
Gould et al. (45) Date of Patent: Nov. 19, 2013

(54) PROCESSING MEAT TRIM (75) Inventors: Stacey Gould, Meeker, CO (US); Rudy Steiner, Dodge City, KS (US)

(73) Assignee: Cargill, Incorporated, Wayzata, MN (US)

( * ) Notice: Subject to any disclaimer, the term of this patent is extended or adjusted under 35 U.S.C. 154(b) by 471 days.

(21) Appl. No.: 12/867,830

(22) PCT Filed: Feb. 12, 2009

(86) PCT No.: PCT/US2009/000904
§ 371 (c)(1),
(2), (4) Date: Nov. 15, 2010

(87) PCT Pub. No.: WO2009/102457
PCT Pub. Date: Aug. 20, 2009

(65) Prior Publication Data
US 2011/0062257 A1 Mar. 17, 2011

Related U.S. Application Data

(60) Provisional application No. 61/065,836, filed on Feb. 15, 2008.

(51) Int. Cl.
*B07C 5/00* (2006.01)
(52) U.S. Cl.
USPC ........................................ 209/552; 452/184

(58) Field of Classification Search
USPC .................. 209/552, 577, 587, 933; 452/184; 426/231
See application file for complete search history.

(56) References Cited

U.S. PATENT DOCUMENTS

| | | | | | |
|---|---|---|---|---|---|
| 3,930,991 | A | * | 1/1976 | Gillespie | 209/3.1 |
| 4,106,628 | A | * | 8/1978 | Warkentin et al. | 209/556 |
| 4,226,540 | A | * | 10/1980 | Barten et al. | 356/445 |
| 5,215,772 | A | * | 6/1993 | Roth | 426/231 |
| 5,482,166 | A | * | 1/1996 | Brown | 209/580 |
| 7,123,685 | B2 | * | 10/2006 | Ostergaard et al. | 378/53 |
| 7,857,500 | B2 | * | 12/2010 | Morin et al. | 366/152.1 |
| 8,147,299 | B2 | * | 4/2012 | McKenna et al. | 452/157 |
| 2012/0018353 | A1 | * | 1/2012 | McKenna et al. | 209/3.1 |
| 2012/0040060 | A1 | * | 2/2012 | Virippil et al. | 426/231 |

FOREIGN PATENT DOCUMENTS

| | | |
|---|---|---|
| GB | 2116732 A | 9/1983 |
| WO | WO 9726533 A1 * | 7/1997 |
| WO | 00/23771 A1 | 3/2002 |
| WO | 03/046533 A2 | 6/2003 |
| WO | 2005/047829 A1 | 5/2005 |

* cited by examiner

*Primary Examiner* — Joseph C Rodriguez (57) ABSTRACT

Meat trim portions are sorted by employing quantitative lean point analysis and one or more sorting steps. Embodiments of the present invention are adapted to make lean point determinations, to compare the determinations to one or more sorting parameters, and to direct meat trim portions to one of a plurality of containers based on the comparison. Meat trim portions from each container are subsequently processed into ground meat.

13 Claims, 8 Drawing Sheets

PROCESSING MEAT TRIM

CROSS REFERENCE TO RELATED APPLICATIONS

This application claims the benefit of International Application No. PCT/US2009/000904 filed 12 Feb. 2009 entitled PROCESSING MEAT TRIM, which claims the benefit of U.S. Application Ser. No. 61/065,836 filed 15 Feb. 2008 entitled METHODS AND SYSTEMS FOR PROCESSING MEAT TRIM, both of which are incorporated by reference herein in their entirety

TECHNICAL FIELD

The present invention relates to methods for processing meat products. More particularly, the present invention relates to methods and systems for sorting and processing meat trim into ground meat.

BACKGROUND

During commercial meat processing, animal carcasses are fabricated into smaller meat portions including primal, sub-primal, and trim portions, for example. Meat trim, which generally include lesser value meat cuts such as chucks, shanks, rounds, and sirloins, is commonly processed into ground meat for use in burgers and sausages, and the like. The ratio of lean to fat is often referred to as the "lean point" of meat trim as well as the resulting ground meat and has a significant impact on the value and labeling of the resulting ground meat product.

In conventional beef processing operations, meat trim is accumulated in one or more containers prior to grinding, often based on a visual assessment of the lean point of the meat trim. A sample of each hopper is then analyzed to estimate the lean point of the entire hopper prior to grinding. The accuracy of this lean point estimate is based largely on whether the analyzed sample accurately reflects the lean point of the meat trim in the whole container. Re-grinding of the resulting meat products may be required if the core sample is not accurate.

A more recent approach is to determine the lean point of all meat trim on a generally continuous basis using automated lean point analysis systems such as those described in International Publication No. WO 97/26533, the entire disclosure of which is incorporated herein by reference for all purposes. An example of a commercially available lean point analysis system is the Meatmaster™ x-ray system available from Foss Companies of Eden Prairie, Minn.

SUMMARY

The present invention provides methods and systems for sorting meat trim portions by employing quantitative lean point analysis and one or more sorting steps. Embodiments of the present invention are adapted to make lean point determinations, to compare the determinations to one or more sorting parameters, and to direct meat trim portions to one of a plurality of containers based on the comparison. Meat trim portions from each container are subsequently processed into ground meat.

In an exemplary aspect of the present invention, a method for sorting meat trim portions obtained from a source of meat trim portions is provided. A meat type and lean point estimate is determined for the meat trim portions. One or both of the meat type and estimated lean point is compared to one or more of various target lean points and meat types associated with a plurality of containers. The meat trim portions are then deposited into the container having one or both of the target lean point and meat type corresponding to one or both of the identified meat type and estimated lean point. Meat trim portions are then obtained from one or more of the containers, and a lean point determination is made. One or both of determined lean point of the meat trim portions and the previously identified meat type is compared with one or more of various target lean points and meat types associated with each of a plurality of combination bins. The meat trim portions are deposited into the combination bin having one or both of a target lean point and meat type that corresponds to one or both of the identified meat type and determined lean point.

In another exemplary aspect of the present invention, a method for sorting meat trim portions obtained from a source of meat trim portions is provided. A lean point determination is made for the meat trim portions and compared to a plurality of predetermined lean point parameters associated with each of a plurality of combination bins. The meat trim portions are then deposited into one of the combination bins based on the comparison.

In another exemplary aspect of the present invention, a system for processing meat trim portions is provided. The system includes at least one lean point analyzer configured to determine a plurality of lean points for the meat trim portions, a plurality of combination bins configured to receive the meat trim portions, each combination bin being associated with a plurality of predetermined lean point parameters, a conveyor for transporting meat trim portions from the lean point analyzer to the plurality of combination bins, and a control system. The control system is configured to receive the lean point determinations from the lean point analyzer, compare the lean point determinations to the predetermined lean point parameters, select a combination bin based on the comparison, and control the deposition of meat trim portions into the combination bin based on the comparison.

In another aspect of the present invention, a method for sorting meat trim portions having a meat type and lean point is provided. The method comprises: providing a plurality of meat trim portions; identifying the meat type of each meat trim portion; determining information associated with the lean point of each meat trim portion; comparing one or both of the meat type of each meat trim portion and the information associated with the lean point of each meat trim portion to one or both of a first group of meat types and a first group of target lean points, wherein one or both of each meat type of the first group of meat types and each target lean point of the first group of target lean points corresponds with at least one of a plurality of containers; and depositing each meat trim portion into the container of the plurality of containers having one or both of the meat type and target lean point corresponding with one or both of the identified meat type and the determined information associated with the lean point.

In another aspect of the present invention, a method for sorting meat trim portions having a meat type and lean point is provided. The method comprises: selecting a meat trim portion from a container of the plurality of containers; measuring the lean point of a meat trim portion selected from the container of the plurality of containers; comparing one or both of the meat type and the measured lean point to a second group of meat types and a second group of target lean points wherein each meat type of the second group of meat types and each target lean point of the second group of target lean types is associated with at least one of a plurality of combination bins; and depositing the meat trim portion into the combination bin having one or both of the meat type and the target lean point corresponding with one or both of the identified meat type and determined lean point.

The above-described method for sorting meat trim portions may further comprise: providing a plurality of meat trim portions; determining the lean point of each meat trim portion; comparing the determined lean point of each meat trim portion to a lean point target and at least one additional lean point parameter assigned to each of a plurality of combination bins; and depositing each of the meat trim portions into the combination bin of the plurality of combination bins having the lean point target and at least one additional lean point parameters corresponding to the determined lean point of each meat trim portion.

The above-described method for sorting meat trim portions may further comprise: determining the lean point of each meat trim portion; comparing the determined lean point to a plurality of target lean points, wherein each target lean point is associated with one of a plurality of containers; depositing each meat trim portion into the container assigned the lean point target corresponding to the determined lean point of the each meat trim portion; and determining the lean point of one or more meat trim portions deposited in one or more of the containers.

The above-described method for sorting meat trim portions may further comprise:
identifying a meat type and estimated lean point for each meat trim portion; comparing one or both of the estimated lean point and the meat type to one or both of a meat type and predetermined lean point target associated with each of a plurality of containers; depositing each meat trim portion into the container having one or both of the meat type and lean point target corresponding to each meat trim portion; and determining the lean point of one or more meat trim portions deposited in one or more of the containers.

In yet another aspect of the present invention a system for processing meat trim portions is provided. The system comprises: at least one lean point analyzer configured to measure the lean point for each of a plurality of meat trim portions; a plurality of combination bins adapted to receive meat trim portions, each combination bin associated with a plurality of predetermined lean point parameters including a lean point target and at least one additional parameter; a conveyor for transporting meat trim portions from the at least one lean point analyzer to the plurality of combination bins along a processing direction; and a control system configured to receive a plurality of lean point measurements from the at least one lean point analyzer, compare the lean point measurements to the predetermined lean point parameters associated with each combination bin, select a combination bin based on the comparison, and control the conveyance and deposition of meat trim portions into the selected combination bin.

BRIEF DESCRIPTION OF THE DRAWINGS

The accompanying drawings, which are incorporated in and constitute a part of this disclosure, illustrate several aspects of the present invention and together with description of the exemplary embodiments serve to explain the principles of the present invention. A brief description of the drawings is as follows.

DETAILED DESCRIPTION

The exemplary embodiments of the present invention described herein are not intended to be exhaustive or to limit the present invention to the precise forms disclosed in the following detailed description. Rather, the exemplary embodiments described herein are chosen and described so those skilled in the art can appreciate and understand the principles and practices of the present invention.

The present invention generally applies to the processing of red meat slaughter animals, that is, animals that are slaughtered for red meat consumption, including without limitation all ages and classes of bovine, porcine, and ovine animals. Bovine animals include cattle, steers, heifers, cows, bulls, and also buffalo. Porcine animals include sows, gilts, barrows, boars, and feeder pigs. Ovine animals include sheep and lamb. The present invention may also apply to the production of ground meat from other animals as well, such as poultry or fish. Although this disclosure is generally directed toward the production of ground beef, the present invention is not necessarily limited to production of ground beef.

Figure 1:
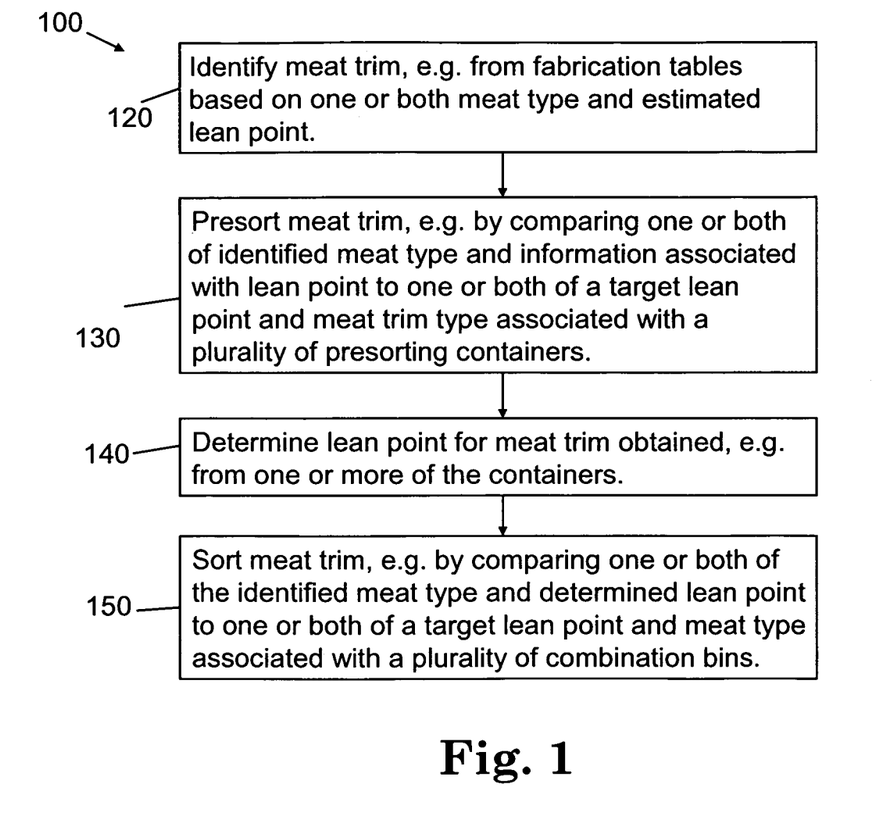
FIG. 1 is a flow-chart illustrating an exemplary method of processing meat trim in accordance with the present invention.
Figure 2:
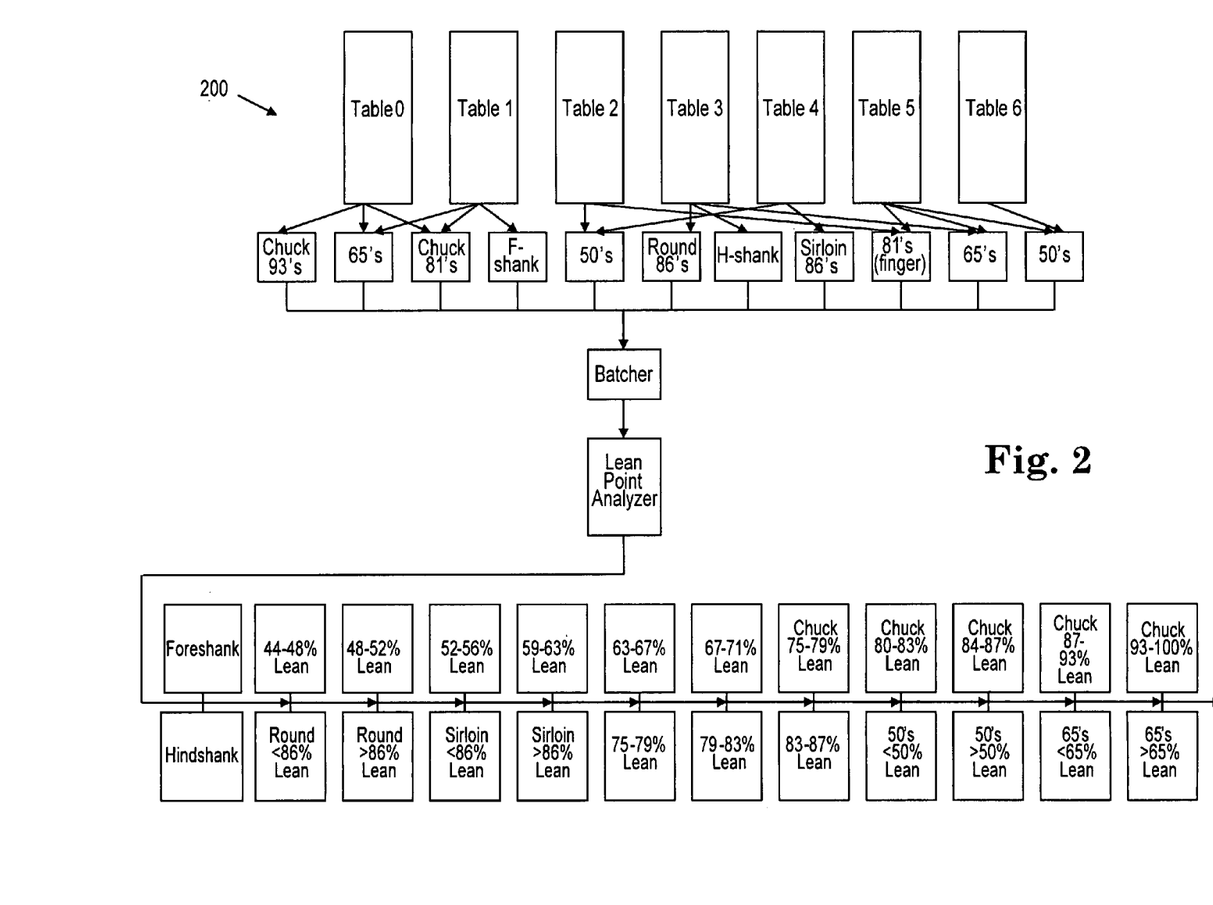
FIG. 2 is a schematic illustration of an exemplary system for processing meat trim in accordance with the present invention.

FIGS. 1 and 2 illustrate, respectively, a method 100 and system 200 for processing portions of meat trim according to an exemplary embodiment of the present invention. According to the illustrated method 100, portions of meat trim obtained from one or more fabrication tables are identified by one or more of meat trim type (e.g., chuck, shank, sirloin) and information associated with lean point (estimated lean point, for example) as indicated by reference numeral 120. This identification process comprises, in an exemplary embodiment, a qualitative determination performed by trained personnel. In another exemplary embodiment, an automated identification system is used. In yet another exemplary embodiment, a combination of qualitative determination and automatic identification is used.

Portions of meat trim are then preferably presorted into a plurality of containers by comparing one or both of the identified meat type and the information associated with the lean point of each meat trim portion (estimated lean point, for example) with one or both of a predetermined target lean point (or lean point range) and meat trim type associated with each container and as indicated by reference numeral 130. In an exemplary embodiment, the presorting step 130 comprises a manual process in which trained personnel compare one or both of the identified meat trim type and lean point estimate of a meat trim portion to the target lean point and meat trim type of each container, and then deposit the meat trim portion into the proper container. In another exemplary embodiment, automated systems are used. In yet another exemplary embodiment, a combination of qualitative determination and automatic identification is used.

FIG. 2 shows a plurality of fabrication tables and a plurality of containers associated with one or both of target lean points and meat trim types. For example, portions of meat trim suitable for presorting into the "Chuck 93's" container, include chuck meat trim portions having a target lean point of at least ninety-three percent. Accordingly, portions of meat trim identified as meeting these parameters are deposited in the Chuck '93 container. In an exemplary embodiment, the presorting parameters for the containers do not necessarily require both a meat type and a lean point estimate. The "50's" presorting containers, for example, are designated for any meat trim type identified as being at least fifty percent visual lean. Similarly, the "H-shank" pre-sorting container only takes meat type into account.

Once the portions of meat trim are presorted, the lean point of portions of meat trim originating from a particular presorting container is determined using a lean point analysis system as indicated by reference numeral 140. In an exemplary system, uniformly sized portions of meat trim are formed using a meat batcher commercially available from, for example, Gainco. The lean points of the resulting portions of meat trim can then be analyzed on a continuous basis. Suitable lean point analysis techniques include x-ray analysis, microwave spectrometry, electromagnetic analysis, infrared, optical refractometry, gamma ray radiation, and color analysis. In an exemplary embodiment, one or more Meatmaster™ analyzers can be used. The Meatmaster™ analyzer is commercially available from Foss.

After performing lean point analysis, the meat trim portions are then sorted into a plurality of combination bins as indicated by reference numeral 150. Like the presorting containers, each combination bin 150 is associated with one or both of a predetermined target lean point and meat trim type. Sorting into the combination bins 150 is preferably performed by comparing one or both of the determined lean point (based on the lean point analysis) and the previously identified meat type (based on the target meat type of the presorting container) of each meat trim portion with one or both of the target lean point and meat type. The sorted meat trim portion is then deposited in the appropriate combination bin 150.

In an exemplary embodiment, the second sorting step preferably comprises a manual comparison and deposition process. In another exemplary embodiment, such sorting comprises a partially or fully automated process in which a control system, such as the control system shown in FIG. 7 and discussed below, is used. Preferably, the control system records one or both of the determined lean point and meat trim type for each portion of meat trim, makes a comparison with one or both of the target lean points and meat trim type of each combination bin, and controls one or more conveyors to deposit the portion of meat trim in the appropriate combination bin.

In the exemplary system shown in FIG. 2, the presorting step employs fewer containers than the number of combination bins employed in the second sorting step. Accordingly, the target lean points of the combination bins are more narrowly defined than those of the presorting containers. As shown in FIG. 2, for example, five "Chuck" combination bins are used compared to two "Chuck" presorting containers. In the exemplary embodiment shown in FIG. 2, the portions of meat trim are conveyed directly to the appropriate combination bin based on the comparison and deposited in the combination bin. In another exemplary embodiment, portions of meat trim are first sorted into a plurality of master containers based on the desired sorting parameters, which may be further processed (e.g., combined) to form desired combination bins.

Although FIG. 2 shows that portions of meat trim exiting the lean point analyzer can be deposited in any of the combination bins, the identified meat trim type and lean point of the portion of meat trim effectively narrows the number of combination bins eligible to receive a particular portion of meat trim. In an exemplary embodiment, for example, portions of meat trim originating from the presorting container identified as "Chuck 93's" can only be sorted into the "Chuck" combination bin, or more particularly into the "Chuck 93-100% Lean" combination bin or the "Chuck 87-93% Lean" combination bin. In this manner, the presorting step significantly increases the efficiency, accuracy and preciseness of the second sorting step. Although FIG. 2 illustrates only one lean point analyzer, multiple analyzers and processing lines can be utilized.

The resulting combination bins are processed into ground meat, which may be identified and marketed by a specific meat type and lean point range. The sorting steps described with reference to FIGS. 1 and 2 provide an efficient method for sorting meat trim within a narrow range of parameters. This, in turn, allows for the production of ground meat products having particular meat types and precise lean point ranges, which can be further customized based on customer demand.

Figure 3:
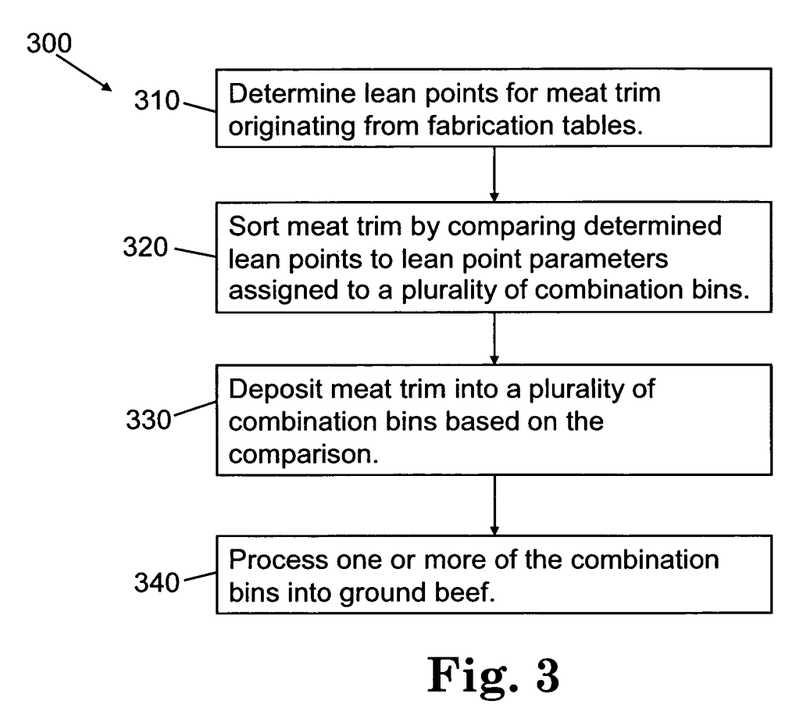
FIG. 3 is a flow-chart illustrating an exemplary method of processing meat trim in accordance with the present invention.
Figure 4:
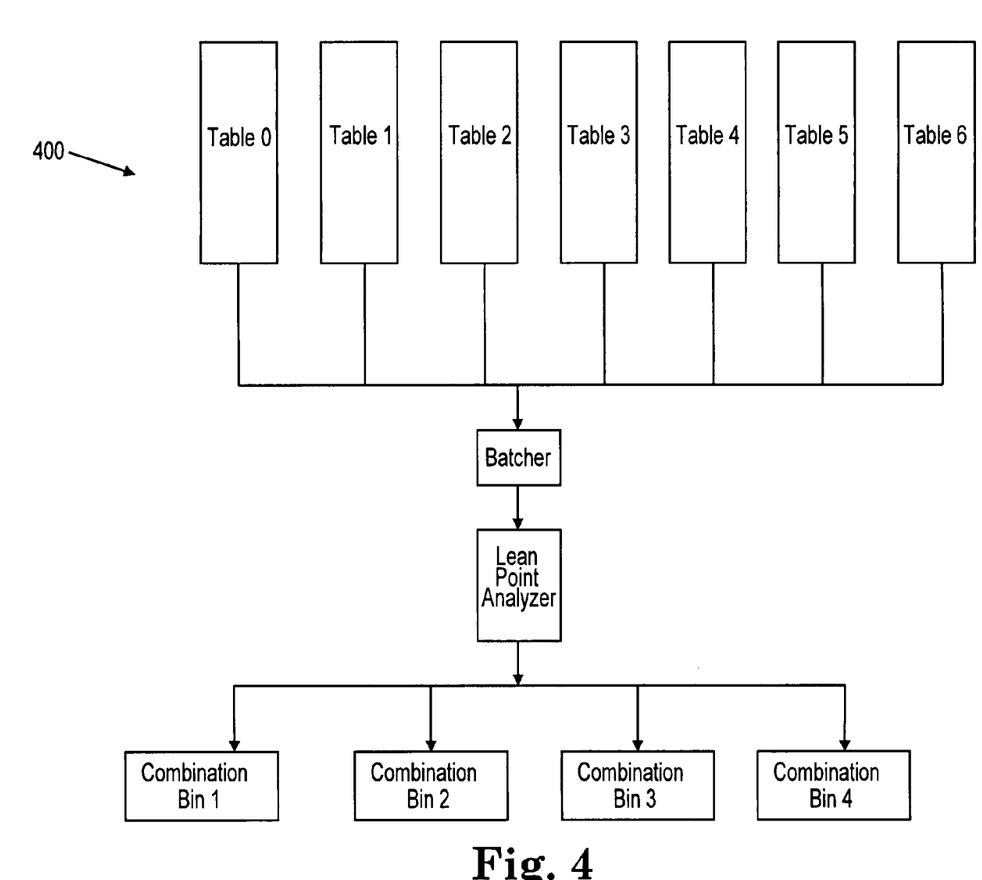
FIG. 4 is a schematic illustration of an exemplary system for processing meat trim in accordance with the present invention.

FIG. 3 illustrates a method 300 for preparing ground beef according to another exemplary embodiment of the present invention, in which a single sorting step takes place after quantitative lean point analysis. According to method 300, meat trim accumulated at the trim tables are first subjected to a quantitative lean point determination as indicated by reference numeral 310. Each portion of meat trim is then sorted into one of a plurality of combination bins by comparing the determined lean point to a plurality of predetermined lean point parameters associated with each combination bin as indicated by reference numeral 320. Based on this comparison, the meat trim is deposited into one of the combination bins as indicated by reference numeral 330. FIG. 4 shows a schematic illustration of an exemplary system 400 for carrying out this method.

In an exemplary embodiment, the lean point parameters include a target lean point target such as described with respect to FIGS. 1 and 2, and at least one additional lean point parameter that provides for a more precise and accurate combination bin. Examples of suitable predetermined lean point parameters for this and other embodiments include maximum and minimum lean point averages for portions of meat trim in a combination bin, maximum standard deviation of lean points of portions of meat trim in a combination bin, maximum average lean point differences between combination bins having one or more of the same desired lean point, upper or lower lean point targets for each combination, and standard deviation of lean point within a particular portion of meat trim.

In an exemplary embodiment, lean point parameters preferably remain constant with respect to a particular combination bin. In another exemplary embodiment lean point parameters change as the combination bins are filled with portions of meat trim. In certain exemplary embodiments, the lean point parameters are based on the lean points of portions of meat trim already sorted into a particular combination bin so all meat trim deposited into a particular combination bin has narrowly defined lean point characteristics.

Figure 7:
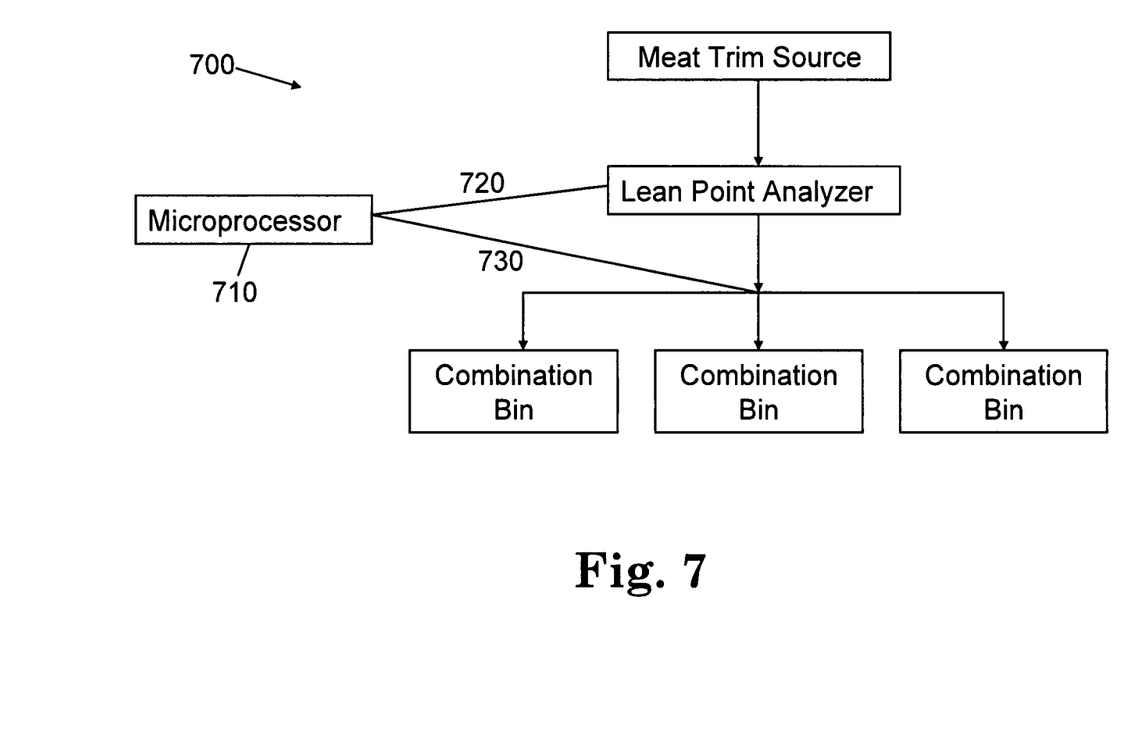
FIG. 7 is a schematic illustration of an exemplary control system for processing meat trim in accordance with the present invention.

As shown in FIG. 7 and discussed below, the sorting may be carried out using a control system having a microprocessor capable of recording the determined lean point for each portion of meat trim, comparing the determined lean point to the lean point parameters and performing any calculations necessary to determine the appropriate combination.

An exemplary set of lean point parameters for a 2000 pound combination bin with an identified target lean point include the following:

PARAMETER 1: for the first 500 pounds of meat trim added to the combination bin, the upper and lower limits of running weight-average must be within 3 percent fat from the target lean point of the combination bin;

PARAMETER 2: for the next 500 pounds (i.e., up to a total of 1,000 lbs.) the upper and lower limits of running weight-average must be within 2 percent fat from the target lean point of the combination bin;

PARAMETER 3: for the next 500 pounds (i.e., up to a total of 1,500 lbs.) the upper and lower limits of running weight-average must be within 1 percent fat from the target lean point of the combination bin; and PARAMETER 4: for the next 500 pounds (i.e., up to a total of 2,000 lbs.) the upper and lower limits of running weight-average must be within 0.5 percent fat from the target lean point of the combination bin.

Another set of exemplary lean point parameters, which may be used in conjunction with or separately from the preceding parameters, includes the following:

PARAMETER 1: for the first 500 lbs of meat trim, each analyzed portion of meat trim must have a maximum standard deviation of +/−3.5 percent;

PARAMETER 2: for the next 500 lbs of meat trim (i.e. up to a total of 1,000 lbs), each analyzed portion of meat trim must have a maximum standard deviation of +/−2.0 percent;

PARAMETER 3: for the next 500 lbs of meat trim (i.e. up to a total of 1,500 lbs), each analyzed portion of meat trim must have a maximum standard deviation of +/−1.0 percent; and PARAMETER 4: for the next 500 lbs of meat trim (i.e. up to a total of 2,000 lbs), each analyzed portion of meat trim must have a maximum standard deviation of +/−0.5 percent.

Additional exemplary parameters that each could be used in conjunction with or separately from the preceding parameters include:

a maximum weighted average difference of +/−0.5 percent fat between combinations having the same target lean point;

a maximum standard deviation of +/−0.5 percent fat between combinations having the same target lean point;

a maximum of 1,000 lbs. of meat trim with a lean point of 1 percent fat lower than the target lean point;

a maximum of 1,500 lbs. of meat trim with a lean point of 1 percent fat higher than the target lean point;

an upper lean point limit for each analyzed portion of meat trim of 5 percent fat above the target lean point;

a lower lean point limit for each analyzed portion of meat trim of 3 percent fat below the target lean point;

By utilizing the lean point parameters discussed above, combination bins having very precise and accurate lean points can be processed. As discussed with respect to the embodiment illustrated in FIGS. 1 and 2, ground beef prepared from such combination bins can be advantageously labeled and sold.

Figure 5:
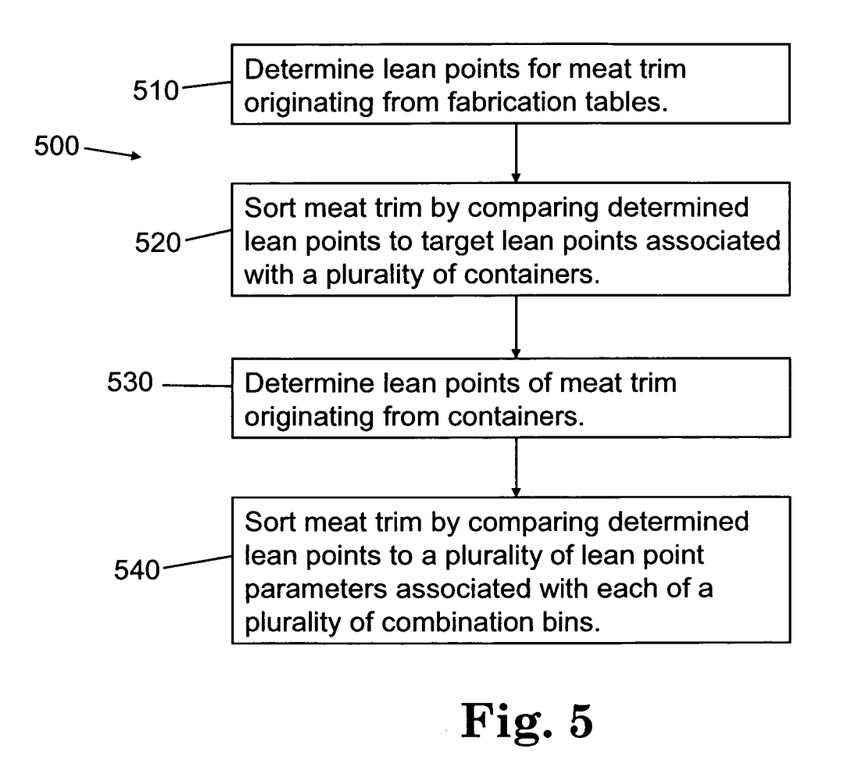
FIG. 5 is a flow-chart illustrating an exemplary method of processing meat trim in accordance with the present invention.
Figure 6:
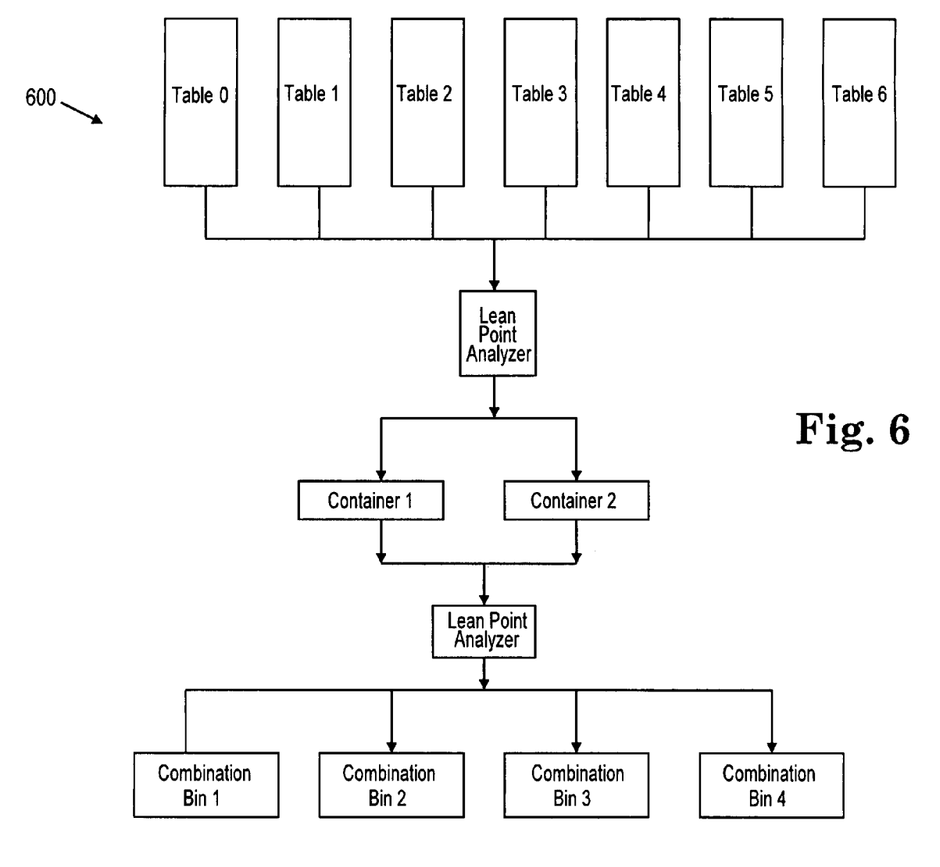
FIG. 6 is a schematic illustration of an exemplary system for processing meat trim in accordance with the present invention.

FIGS. 5 and 6 show a method 500 and system 600 according to another exemplary embodiment of the present invention. In this embodiment, quantitative lean point determinations are made for portions of meat trim originating from the trim tables as indicated by the reference numeral 510. The portions of meat trim are then sorted into a plurality of containers by comparing the lean point determinations to a predetermined target lean point assigned to each sorting container as indicated by reference numeral 520. In an exemplary embodiment, two sorting containers, one for meat trim having greater than 50 percent fat and another meat trim having less than 50 percent fat are utilized. In addition to this target lean point, suitable lean point parameters discussed with respect to FIGS. 3 and 4 may also be employed with respect to each container.

Portions of meat trim originating from a particular sorting container are subjected to a second lean point analysis as indicated by reference numeral 530 and are then sub-sorted into one or more combinations each of which is associated with a plurality of lean point parameters as indicated by reference numeral 540. As described with respect to FIGS. 3 and 4, sub-sorting occurs by comparing the lean points of the portions of meat trim to multiple lean point parameters assigned to each of a plurality of sub-sorting meat containers. In an exemplary embodiment, such as that shown in FIG. 6, the number of sub-sorting containers is greater than the number of sorting containers. For example, if two sorting containers (+/−50% lean) are utilized, three or more sub-sorting containers (50% lean, 75% lean, 93% lean) are also preferably utilized. Employing multiple sorting steps provides a more granulated sorting approach, which may provide increased preciseness and/or accuracy with respect to the target lean point of a combination.

In another exemplary embodiment, the pre-sorting step described with respect to FIGS. 1-2 is combined with the sorting step described with respect to FIGS. 3-4. More particularly, meat trim is first presorted into containers based on one or both of meat type and estimated lean point. Lean points are then determined for portions of meat trim originating from a particular container. The determined lean point of each portion of meat trim is then compared to the multiple lean point parameters associated with the combinations as discussed with respect to FIGS. 2-4. Meat type may also be taken into consideration.

Figure 8:
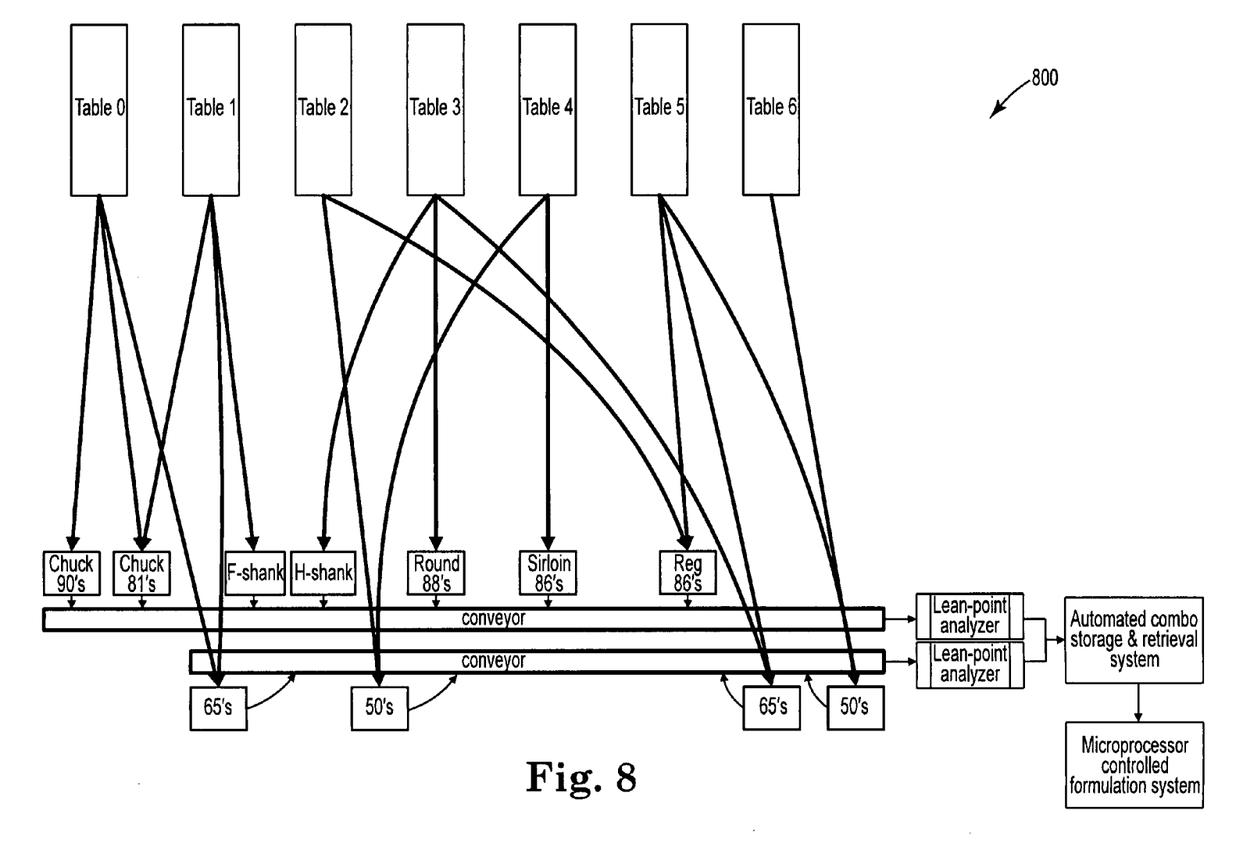
FIG. 8 is a schematic illustration of an exemplary system for processing meat trim in accordance with the present invention.

FIG. 8 illustrates an exemplary system 800 for preparing ground beef according to another exemplary embodiment of the present invention. The exemplary system 800 includes a plurality of fabrication tables from which meat trim is provided to a plurality of storage containers. In the exemplary embodiment, each fabrication table provides one or more known meat trim types. Each meat trim type is preferably assigned to a particular storage container even though individual portions of the meat trim of that meat type will have a range of lean points. As an example, fabrication Table 1 provides meat trim identified as rope meat. All rope meat is directed to the storage container designated as the Chuck 90's storage container without consideration of the lean point of the individual pieces of rope meat. This procedure is preferably utilized for sorting meat trim from the plurality of fabrication tables into the plurality of storage containers.

The storage containers are positioned relative to a conveyor system that provides meat trim from the storage containers to a lean point analyzer. Preferably, when a certain event occurs such as, when a storage container comprises a predetermined weight of product, or a changeover is needed, the entire contents of the storage container is discharged to the conveyor system as a batch and processed by the lean point analyzer. After being processed by the lean point analyzer, the batch of meat trim is loaded into a combination container and assigned a designation including at least the measured lean point and the meat type. The combination container is then placed into an automated storage and retrieval system. The automated storage and retrieval system functions to formulate a batch of meat trim to be processed into ground beef having a desired lean point. In particular, the automated storage and retrieval system includes a microprocessor controlled formulation system that uses the desired lean point value to identify and use meat trim from one or more of the stored combination containers to provide ground beef having the desired lean point in the desired amount.

Where there is a substantial change in the lean point of a stream of product being measured by the lean point analyzer it may be desirable to adjust certain processing parameters related to the lean point analyzer. Accordingly, in accordance with the present invention, the exemplary system 800 includes an optional second conveyor that is utilized for meat trim types having lean points that are substantially different from the lean points processed with the first conveyor.

As previously noted, the various exemplary embodiments set forth above may utilize a control system for automating the sorting and analysis steps. A schematic illustration of an exemplary control system 700 in accordance with the present invention is shown in FIG. 7. The system 700 preferably includes a microprocessor 710, at least one analysis interface 720 and at least one sorting interface 730.

Any suitable microprocessor 710 can be used in accordance with the present invention. As an example, the microprocessor 710 comprises a computer having system control capabilities for controlling the delivery of portions of meat trim between the containers, lean point analysis and combinations, a database for storing lean point determinations and/or other characteristics relating to the portions of meat trim, and software (or similar means) for comparing lean point determinations and you want the kind you want when you want the pairs are other meat trim characteristics to the various sorting parameters associated with the containers and combinations. In an exemplary embodiment, a programmable logic controller with appropriate peripheral sensors and the like is employed.

The analysis interface 720 is preferably configured to communicate lean point determinations from the lean point analyzer to the microprocessor 710. In an exemplary embodiment, the lean point determination for each portion of meat trim is preferably communicated to the microprocessor 710 on a real time basis. The sorting interface 730 communicates with the microprocessor 710 to control the transport of portions of meat trim into the various containers or combinations. These interfaces can include peripheral input devices and sensors, and the like for communication of the appropriate information. Control system 700 also preferably includes conventional conveyors and the like for transporting the portions of meat trim.

For the embodiment described in FIGS. 1-2, sorting interface 730 preferably communicates the presorting parameters for the container from which a portion of meat trim originates. The analysis interface 720 similarly communicates the lean point for each portion of meat trim. The microprocessor 710 identifies each portion of meat trim that is processed and associates each portion of meat trim with the identified meat trim type and determined lean point. The microprocessor 710 then preferably compares this information to the target lean point and meat trim type associated with each combination, selects the proper combination and directs the portion of meat trim to the combination via combination interface 730.

For certain exemplary embodiments described with respect to FIGS. 3-6, the microprocessor 710 not only associates information with each individual portion of meat trim, but is also preferably capable of performing calculations to compare this information with the lean point parameters associated with each container. Such calculations can include a running weighted-average of the percent fat values, a weighted average based on the percent fat for each analyzed portion of meat trim, a weighted averaged based on actual product weight, standard deviation of percent fat values for each analyzed portion of meat trim or the weighted averages thereof, the maximum percent value and the minimum fat value. The microprocessor 710 then compares these calculations to the lean point parameters associated with the combinations, selects the combination, and directs each portion of meat trim to the selected combination.

The present invention has now been described with reference to several exemplary embodiments thereof. The entire disclosure of any patent or patent application identified herein is hereby incorporated by reference for all purposes. The foregoing disclosure has been provided for clarity of understanding by those skilled in the art of meat processing. No unnecessary limitations should be taken from the foregoing disclosure. It will be apparent to those skilled in the art that changes can be made in the exemplary embodiments described herein without departing from the scope of the present invention. Thus, the scope of the present invention should not be limited to the exemplary structures and methods described herein, but only by the structures and methods described by the language of the claims and the equivalents of those claimed structures and methods.

What is claimed is:

1. A method for sorting meat trim portions having a meat type and lean point, the method comprising:
    providing a plurality of meat trim portions;
    identifying the meat type of each meat trim portion;
    determining information associated with the lean point of each meat trim portion;
    comparing one or both of the meat type of each meat trim portion and the information associated with the lean point of each meat trim portion to one or both of a first group of meat types and a first group of target lean points, wherein one or both of each meat type of the first group of meat types and each target lean point of the first group of target lean points corresponds with at least one of a plurality of containers;
    depositing each meat trim portion into the container of the plurality of containers having one or both of the meat type and target lean point corresponding with one or both of the identified meat type and the determined information associated with the lean point;
    selecting a meat trim portion from a container of the plurality of containers;
    measuring the lean point of a meat trim portion selected from the container of the plurality of containers;
    comparing one or both of the meat type and the measured lean point to a second group of meat types and a second group of target lean points wherein each meat type of the second group of meat types and each target lean point of the second group of target lean types is associated with at least one of a plurality of combination bins; and
    depositing the meat trim portion into the combination bin having one or both of the meat type and the target lean point corresponding with one or both of the identified meat type and determined lean point.

2. The method of claim 1, wherein determining information associated with the lean point of each meat trim portion comprises estimating the lean point of each meat trim portion.

3. The method of claim 1, wherein determining information associated with the lean point of each meat trim portion comprises measuring the lean point of each meat trim portion.

4. The method of claim 1, comprising grouping plural meat trim portions of the plurality of meat trim portions into batches of meat trim portions wherein the batches of meat trim portions comprise at least one of uniform weight, uniform volume, and uniform shape.

5. The method of claim 4, comprising determining the lean point of each batch of meat trim portions.

6. The method of claim 1, wherein the meat trim portions comprise one or more of meat from bovine, porcine, and bovine animals, poultry, and fish.

7. The method of claim 1, comprising processing the meat trim portions into ground meat.

8. A method for sorting meat trim portions comprising:
   providing a plurality of meat trim portions;
   determining the lean point of each meat trim portion;
   comparing the determined lean point of each meat trim portion to a lean point target and at least one additional lean point parameter assigned to each of a plurality of combination bins;
   depositing each of the meat trim portions into the combination bin of the plurality of combination bins having the lean point target and at least one additional lean point parameters corresponding to the determined lean point of each meat trim portion;
   selecting a meat trim portion from a container of the plurality of containers;
   measuring the lean point of a meat trim portion selected from the container of the plurality of containers;
   comparing the measured lean point to a second group of target lean points wherein each target lean point of the second group is associated with at least one of a plurality of combination bins; and
   depositing the meat trim portion into the combination bin having the target lean point corresponding with the determined lean point.

9. The method of claim 8, wherein determining the lean point of each meat trim portion comprises:
   determining the lean point of each meat trim portion;
   comparing the determined lean point to a plurality of target lean points, wherein each target lean point is associated with one of a plurality of containers;
   depositing each meat trim portion into the container assigned the lean point target corresponding to the determined lean point of the each meat trim portion; and
   determining the lean point of one or more meat trim portions deposited in one or more of the containers.

10. The method of claim 8, wherein determining the lean point of each meat trim portion comprises:
    identifying a meat type and estimated lean point for each meat trim portion;
    comparing one or both of the estimated lean point and the meat type to one or both of a meat type and predetermined lean point target associated with each of a plurality of containers;
    depositing each meat trim portion into the container having one or both of the meat type and lean point target corresponding to each meat trim portion; and
    determining the lean point of one or more meat trim portions deposited in one or more of the containers.

11. The method of claim 8, wherein the lean point parameters assigned to one or more combination bins change as meat trim portions are deposited into the one or more combination bins.

12. The method of claim 8, comprising grouping plural meat trim portions of the plurality of meat trim portions into batches of meat trim portions wherein the hatches of meat trim portions comprise at least one of uniform weight, uniform volume, and uniform shape.

13. The method of claim 12, comprising determining the lean point of each batch of meat trim portions.

\* \* \* \* \*

UNITED STATES PATENT AND TRADEMARK OFFICE
CERTIFICATE OF CORRECTION

PATENT NO. : 8,584,867 B2  
APPLICATION NO. : 12/867830  
DATED : November 19, 2013  
INVENTOR(S) : Stacey Gould et al.

Page 1 of 1

It is certified that error appears in the above-identified patent and that said Letters Patent is hereby corrected as shown below:

In the Specifications

In column 1, line 12, after "entirety", insert -- . --.

In the Claims

In column 11, line 3, in claim 4, delete "hatches" and insert -- batches --, therefor.

In column 12, line 30, in claim 12, delete "hatches" and insert -- batches --, therefor.

Signed and Sealed this
Eleventh Day of March, 2014

Michelle K. Lee
*Deputy Director of the United States Patent and Trademark Office*